United States Patent
Koskela et al.

(10) Patent No.: US 12,250,749 B2
(45) Date of Patent: Mar. 11, 2025

(54) METHOD FOR DETERMINING AN INITIATION OF RANDOM ACCESS PROCEDURE FOR A USER EQUIPMENT CONFIGURED WITH POWER SAVINGS, AND NETWORK NODE THEREOF

(71) Applicant: Nokia Technologies Oy, Espoo (FI)

(72) Inventors: Timo Koskela, Oulu (FI); Jussi-Pekka Koskinen, Oulu (FI); Sami-Jukka Hakola, Kempele (FI); Juha Pekka Karjalainen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 394 days.

(21) Appl. No.: 17/770,491

(22) PCT Filed: Oct. 26, 2020

(86) PCT No.: PCT/FI2020/050705
§ 371 (c)(1),
(2) Date: Apr. 20, 2022

(87) PCT Pub. No.: WO2021/094649
PCT Pub. Date: May 20, 2021

(65) Prior Publication Data
US 2022/0386409 A1     Dec. 1, 2022

Related U.S. Application Data

(60) Provisional application No. 62/935,917, filed on Nov. 15, 2019.

(51) Int. Cl.
*H04W 76/28*     (2018.01)
*H04W 52/02*     (2009.01)
(Continued)

(52) U.S. Cl.
CPC ....... *H04W 76/28* (2018.02); *H04W 52/0229* (2013.01); *H04W 56/0045* (2013.01); *H04W 74/0833* (2013.01)

(58) Field of Classification Search
CPC ............. H04W 76/28; H04W 52/0229; H04W 56/0045; H04W 74/0833
See application file for complete search history.

(56) References Cited

U.S. PATENT DOCUMENTS

2014/0023054 A1*   1/2014   Yang ................. H04W 72/0446
                                                             370/336
2019/0239187 A1*   8/2019   Islam .................... H04L 1/1812
(Continued)

FOREIGN PATENT DOCUMENTS

WO     2010/111820 A1    10/2010
WO     2018/175596 A1    9/2018

OTHER PUBLICATIONS

"IMT-2020", Wikipedia, Retrieved on Apr. 19, 2022, Webpage available at : https://en.wikipedia.org/wiki/IMT-2020.
(Continued)

*Primary Examiner* — Michael Thier
*Assistant Examiner* — Nevena Zecevic Sandhu
(74) *Attorney, Agent, or Firm* — Barta Jones, PLLC (57) ABSTRACT

The method includes performing at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for a user equipment (UE) to monitor the PDCCH. The method further includes performing a random-access channel (RACH) procedure with the at least one base station based on the control information. The network node performs the method.

19 Claims, 7 Drawing Sheets

(51) Int. Cl.
H04W 56/00 (2009.01)
H04W 74/0833 (2024.01)

(56) References Cited

U.S. PATENT DOCUMENTS

| | | | |
|---|---|---|---|
| 2021/0307036 A1* | 9/2021 | Myung | H04W 72/1268 |
| 2021/0329559 A1* | 10/2021 | Huang | H04W 76/28 |
| 2022/0104158 A1* | 3/2022 | Liu | H04W 56/0015 |
| 2022/0272636 A1* | 8/2022 | Li | H04W 52/02 |

OTHER PUBLICATIONS

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"Minimum requirements related to technical performance for IMT-2020 radio interface(s)", M Series Mobile, radiodetermination, amateur and related satellite services, Report ITU-R M.2410-0, Nov. 2017, 11 pages.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

International Search Report and Written Opinion received for corresponding Patent Cooperation Treaty Application No. PCT/FI2020/050705, dated Feb. 17, 2021, 13 pages.

"Design of PDCCH-based Power Saving Signal and Channel", 3GPP TSG RAN WG1 #97, R1-1907345, Agenda: 7.2.9.1, Apple Inc, May 13-17, 2019, pp. 1-12.

"PDCCH-based power saving signal/channel", 3GPP TSG RAN WG1 #97, R1-1906170, Agenda: 7.2.9.1, vivo, May 13-17, 2019, 10 pages.

Notice of Allowance received for corresponding European Patent Application No. 20887272.1, dated Oct. 11, 2024, 8 pages.

* cited by examiner

METHOD FOR DETERMINING AN INITIATION OF RANDOM ACCESS PROCEDURE FOR A USER EQUIPMENT CONFIGURED WITH POWER SAVINGS, AND NETWORK NODE THEREOF

RELATED APPLICATION

This application was originally filed as PCT Application No. PCT/FI2020/050705, filed on Oct. 26, 2020, which claims priority from U.S. Provisional Application No. 62/935,917, filed on Nov. 15, 2019, each of which is incorporated herein by reference in its entirety.

BACKGROUND OF THE INVENTION

Field of Invention

One or more example embodiments relate to wireless communications networks.

Related Art

Fifth generation (5G) wireless communications networks are a next generation of mobile communications networks. Standards for 5G communications networks are currently being developed by the Third Generation Partnership Project (3GPP). These standards are known as 3GPP New Radio (NR) standards.

SUMMARY OF INVENTION

At least one example embodiment is directed toward a method.

In one example embodiment, the method includes performing, by at least one processor of a user equipment (UE), at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for the UE to monitor the PDCCH; and performing, by the at least one processor, a random-access channel (RACH) procedure with the at least one base station based on the control information.

In one example embodiment, the method further includes determining if the UE is not uplink time aligned with at least one cell; and performing a second monitoring of the PDCCH for indication information, if the UE is not uplink time aligned, the indication information including an indication that the UE is to initiate a random-access channel (RACH) procedure.

In one example embodiment, the second monitoring further includes, monitoring the PDCCH for a downlink control information (DCI) format for the indication information to initiate random access procedure.

In one example embodiment, the second monitoring further includes, monitoring the PDCCH for the PS-DCI format, wherein the PS-DCI format includes the indication information.

In one example embodiment, the second monitoring further includes, scrambling the PS-DCI format using a power saving radio network temporary identifier (PS-RNTI).

In one example embodiment, the RACH procedure includes at least one of a contention free RACH procedure, a PDCCH ordered RACH procedure or a contention based RACH procedure.

In one example embodiment, the method further includes initiating the RACH procedure, in response to the indication information, and determining based on the PS-DCI format whether to enter an active time, the active time starting an on duration timer for a next ON duration in the DRX cycle.

In one example embodiment, the indication information indicates to the UE to start an on duration timer to monitor PDCCH after the completion of the RACH procedure or during the RACH procedure.

In one example embodiment, the PS-DCI format includes a 1 bit signal that triggers the UE to perform a contention free random access procedure (CFRA) using predefined resources configured for the UE.

In one example embodiment, the RACH procedure causes the UE to prioritize physical random-access channel (PRACH) resources that correspond to downlink reference signals that are quasi co-located with PDCCH demodulation reference signal (DMRS) of the PDCCH used to monitor PS-DCI or with PDCCH DMRS used for monitoring PDCCH according to a search space configuration during an active time.

In one example embodiment, the method further includes determining if the UE is configured to receive the PS-DCI format as a group based PS-DCI and a time alignment timer has expired, the PS-DCI format including indication information, the indication information including an indication that the UE is to initiate a random-access channel (RACH) procedure, wherein the performing of the RACH procedure is accomplished using preconfigured RACH resources, if the PS-DCI format is a group based PS-DCI.

In one example embodiment, the performing includes, performing the RACH procedure, based on the indication information, in order to obtain an uplink timing advance.

At least another example embodiment is directed toward a network node.

In one example embodiment, the network node includes a memory containing computer-readable instructions; and at least one processor configured to read and execute the computer-readable instructions, in order to, perform at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for the UE to monitor the PDCCH, and perform a random-access channel (RACH) procedure with the at least one base station based on the control information.

In one example embodiment, the at least one processor is further configured to, determine if the UE is not uplink time aligned with at least one cell, and perform a second monitoring of the PDCCH for indication information, if the UE is not uplink time aligned, the indication information including an indication that the UE is to initiate a random-access channel (RACH) procedure.

In one example embodiment, the at least one processor is further configured to perform the second monitoring by, monitoring the PDCCH for a downlink control information (DCI) format for the indication information to initiate random access procedure.

In one example embodiment, the at least one processor is further configured to perform the second monitoring by, monitoring the PDCCH for the PS-DCI format, wherein the PS-DCI format includes the indication information.

In one example embodiment, the at least one processor is further configured to perform the second monitoring further includes, scrambling the PS-DCI format using a power saving radio network temporary identifier (PS-RNTI).

In one example embodiment, the RACH procedure includes at least one of a contention free RACH procedure, a PDCCH ordered RACH procedure or a contention based RACH procedure.

In one example embodiment, the at least one processor is further configured to: initiate the RACH procedure, in response to the indication information, and determining based on the PS-DCI format whether to enter an active time, the active time starting an on duration timer for a next ON duration in the DRX cycle.

In one example embodiment, the indication information indicates to the UE to start an on duration timer to monitor PDCCH after the completion of the RACH procedure or during the RACH procedure.

At least another example embodiment is directed toward a network node that includes means for performing at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for the UE to monitor the PDCCH, and performing a random-access channel (RACH) procedure with the at least one base station based on the control information.

In one example embodiment, the means are further configured to, determine if the UE is not uplink time aligned with at least one cell, and perform a second monitoring of the PDCCH for indication information, if the UE is not uplink time aligned, the indication information including an indication that the UE is to initiate a random-access channel (RACH) procedure.

In one example embodiment, the means are further configured to perform the second monitoring by, monitoring the PDCCH for a downlink control information (DCI) format for the indication information to initiate random access procedure.

In one example embodiment, the means are further configured to perform the second monitoring by, monitoring the PDCCH for the PS-DCI format, wherein the PS-DCI format includes the indication information.

In one example embodiment, the means are further configured to perform the second monitoring further includes, scrambling the PS-DCI format using a power saving radio network temporary identifier (PS-RNTI).

In one example embodiment, the RACH procedure includes at least one of a contention free RACH procedure, a PDCCH ordered RACH procedure or a contention based RACH procedure.

In one example embodiment, the means are further configured to initiate the RACH procedure, in response to the indication information, and determining based on the PS-DCI format whether to enter an active time, the active time starting an on duration timer for a next ON duration in the DRX cycle.

In one example embodiment, the indication information indicates to the UE to start an on duration timer to monitor PDCCH after the completion of the RACH procedure or during the RACH procedure.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Figure 1:
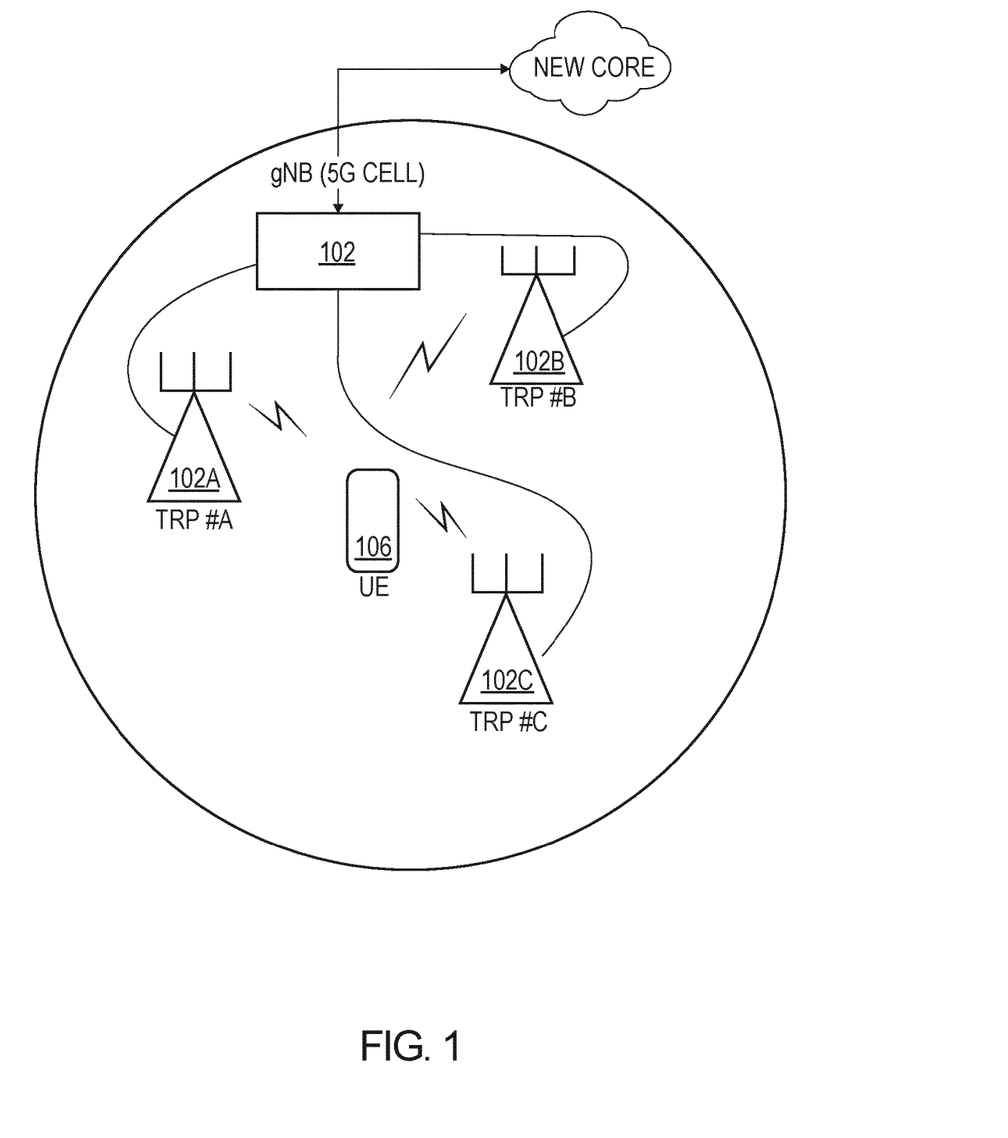
FIG. 1 illustrates a simplified diagram of a portion of a $3^{rd}$ Generation Partnership Project (3GPP) New Radio (NR) access deployment for explaining example embodiments.

FIG. 1 illustrates a simplified diagram of a portion of a 3$^{rd}$ Generation Partnership Project (3GPP) New Radio (NR) access deployment for explaining example embodiments. The 3GPP NR radio access deployment includes a base station (e.g., gNB 102) having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 1, the TRPs 102A, 102B, 102C are configured to communicate with a UE (e.g., UE 106) via one or more transmit (TX)/receive (RX) beam pairs. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 1, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

Figure 2:
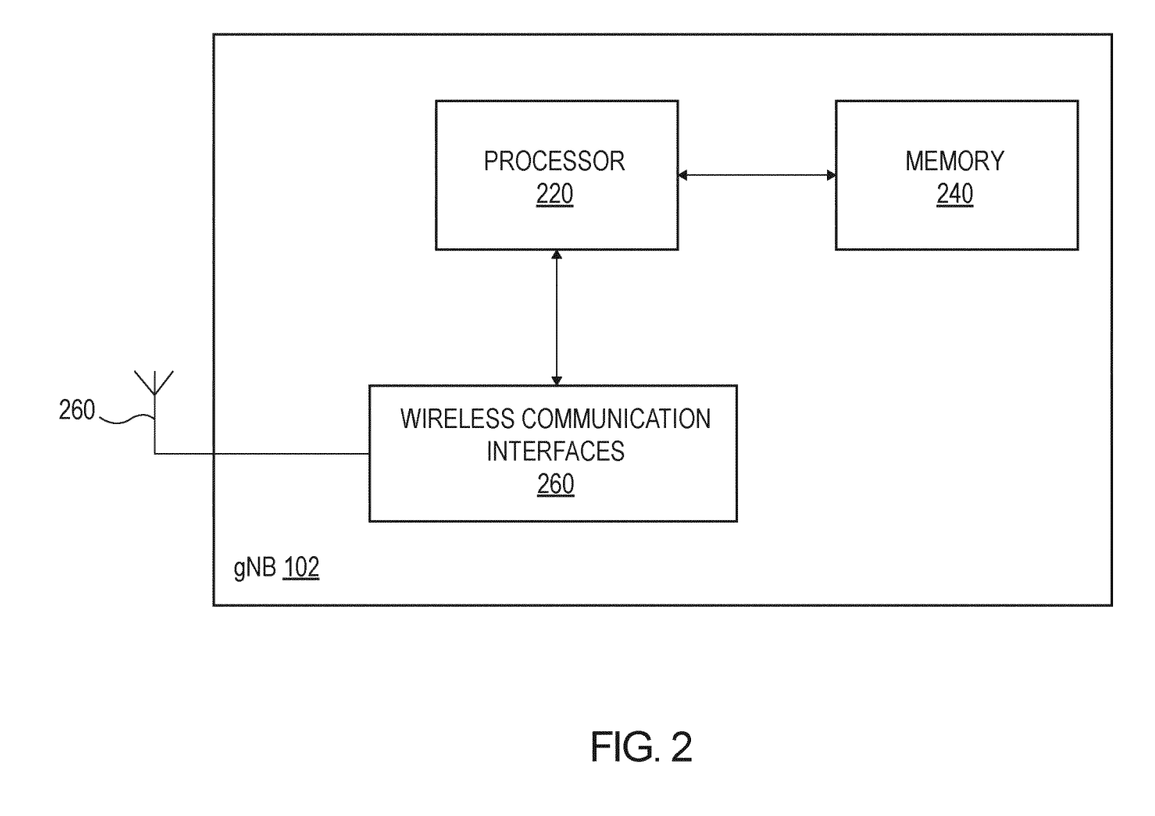
FIG. 2 illustrates a block diagram of a gNB, in accordance with an example embodiment.

FIG. 2 illustrates a block diagram of a gNB (shown in FIG. 1), in accordance with an example embodiment. As shown, the gNB 102 includes: a memory 240; a processor 220 connected to the memory 240; various interfaces 260 connected to the processor 220; and one or more antennas or antenna panels 265 connected to the various interfaces 260. The various interfaces 260 and the antenna 265 may constitute a transceiver for transmitting/receiving data from/to the gNB 102 via a plurality of wireless beams or from/to the plurality of TRPs 102A, 102B, 102C, etc. As will be appreciated, depending on the implementation of the gNB 102, the gNB 102 may include many more components than those shown in FIG. 2. However, it is not necessary that all of these components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the gNB 102 (e.g., functionalities of a gNB, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the various interfaces 260 and programs stored in the memory 240 to set forth the special purpose functionalities of the gNB 102 will vary depending on the implementation of the gNB 102.

The interfaces 260 may also include one or more user input devices (e.g., a keyboard, a keypad, a mouse, or the like) and user output devices (e.g., a display, a speaker, or the like).

Although not specifically discussed herein, the configuration shown in FIG. 2 may be utilized to implement, inter alia, the TRPs 102A, 102B, 102C, other radio access and backhaul network elements and/or devices. In this regard, for example, the memory 240 may store an operating system and any other routines/modules/applications for providing the functionalities of the TRPs, etc. (e.g., functionalities of these elements, methods according to the example embodiments, etc.) to be executed by the processor 220.

Figure 3:
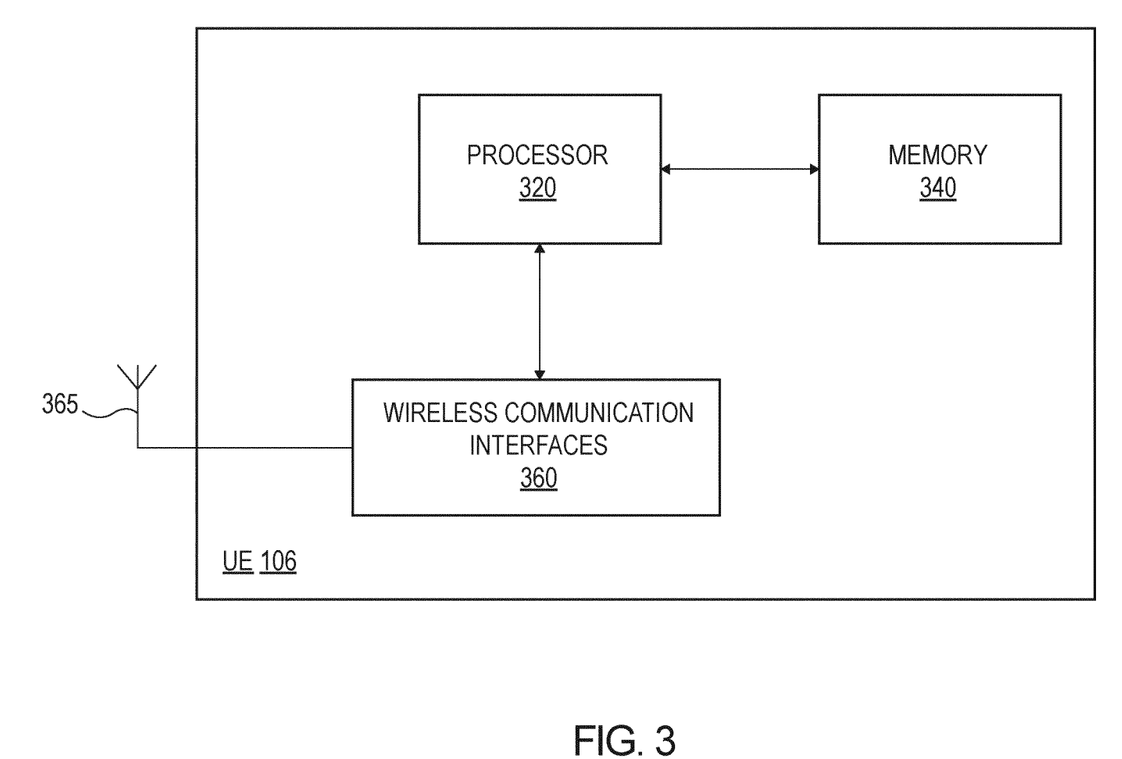
FIG. 3 illustrates a block diagram of a user equipment (UE), in accordance with an example embodiment.

FIG. 3 illustrates a block diagram of a user equipment (UE) 106, in accordance with an example embodiment. The UE 106 is a device used by an end-user to communicate via the 3GPP NR radio access deployment shown in FIG. 1. Examples of UEs include cellular phones, smartphones, tablet, computers, laptop computers, or the like.

As shown, the UE 106 includes: a memory 340; a processor 320 connected to the memory 340; various interfaces 360 connected to the processor 320; and one or more antennas or antenna panels 365 connected to the various interfaces 360. The various interfaces 360 and the antenna 365 may constitute a transceiver for transmitting/receiving data to/from the gNB 102 via a plurality of wireless beams or to/from the plurality of TRPs 102A, 102B, 102C, etc. As will be appreciated, depending on the implementation of the UE 106, the UE 106 may include many more components than those shown in FIG. 3. However, it is not necessary that all of these generally conventional components be shown in order to disclose the illustrative example embodiment.

The memory 340 may be a computer readable storage medium that generally includes a random access memory (RAM), read only memory (ROM), and/or a permanent mass storage device, such as a disk drive. The memory 340 also stores an operating system and any other routines/modules/applications for providing the functionalities of the UE 106 (e.g., functionalities of a UE, methods according to the example embodiments, etc.) to be executed by the processor 320. These software components may also be loaded from a separate computer readable storage medium into the memory 340 using a drive mechanism (not shown). Such separate computer readable storage medium may include a disc, tape, DVD/CD-ROM drive, memory card, or other like computer readable storage medium (not shown). In some example embodiments, software components may be loaded into the memory 340 via one of the various interfaces 360, rather than via a computer readable storage medium.

The processor 320 may be configured to carry out instructions of a computer program by performing the arithmetical, logical, and input/output operations of the system. Instructions may be provided to the processor 320 by the memory 340.

The various interfaces 360 may include components that interface the processor 320 with the antenna 365, or other input/output components. As will be understood, the various interfaces 360 and programs stored in the memory 340 to set forth the special purpose functionalities of the UE 106 will vary depending on the implementation of the UE 106.

The interfaces 360 may also include one or more user input devices (e.g., a keyboard, a keypad, a mouse, or the like) and user output devices (e.g., a display, a speaker, or the like).

General Methodology

At least some example embodiments are directed toward 3GPP New Radio (NR) physical layer developments. Specifically, the example embodiments pertain to physical layer procedures to facilitate power savings for the UE 106, during times when the UE 106 is in a radio resource control (RRC) connected state with the serving gNB 102.

The battery life of the UE 106 is an important aspect of a user's experience, as the battery life will influence an adoption of 5G NR handsets and/or services. Battery life is critical to specify techniques and designs to facilitate efficient means for power savings of the UE 106, to ensure that power efficiency of the UE 106 for use in 5G NR be better than that of, for instance, long-term evolution (LTE).

In particular, energy efficiency within the following two aspects, is of critical importance: (a) efficient data transmission in a loaded case; and (b) low energy consumption when there is no data.

Example embodiments support NR systems for high speed data transport, where bursty user data would be served by a network in very short durations. One efficient power saving mechanism for the UE 106, is to trigger the UE 106 for network access from a power efficient mode. The UE 106 would stay in the power efficient mode, such as a micro sleep, or an 'OFF' period, in a discontinue reception (DRX) cycle, that may be a short or long period of time, unless it the UE 106 is informed of a network access through the power saving framework for the UE 106. Informing the UE 106 may be accomplished via a 'wake-up' procedure, in a 'RRC CONNECTED' state, where the UE 106 is configured to be in the power saving signal/channel, before the 'DRX ON' duration, to trigger the UE 106 to 'wake up' only when there is a downlink (DL) data arrival. Otherwise, the UE 106 is not required to wake up at the DRX ON, at least for purposes of physical downlink control channel (PDCCH) monitoring, if the power saving signal is not detected.

Figure 4:
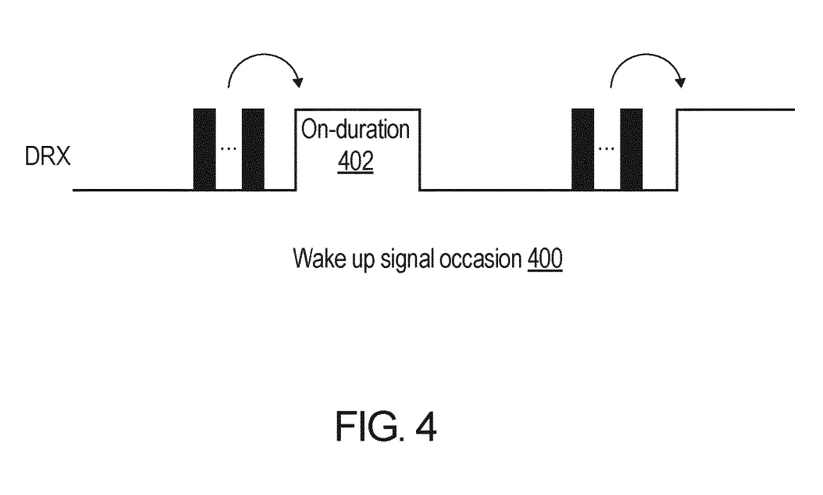
FIG. 4 illustrates a wake up signal (WUS) occasion 400, in an example embodiment.

FIG. 4 illustrates a wake up signal (WUS) occasion 400, in an example embodiment, with a one to one mapping of the WUS occasion with a next (or the on duration that is corresponding to the WUS occasion) on-duration. In one example embodiment, the WUS occasion 400 (e.g., UE 106 reception of a wake up signal) is, for example, a PDCCH based power saving indication, that is configured together with a DRX configuration, where a presence of the signal/channel determines whether the UE 106 is required to monitor PDCCH (according to normal search space configuration), during the next 'On Duration' 402, or in other words, during occurrence of a next (or the corresponding or the associated occurrence of the) 'OnDurationTimer'. In one example, the WUS may control UE to start the drx-onduration timer for the corresponding on duration of the DRX cycle. There may be one to one mapping of WUS occasion or occasions and drx-on duration or one or more WUS occasions may control the start of on duration timer for multiple occurrences of DRX on duration timer. In an example embodiment, the UE 106 is configured to monitor PDCCH based on a wake-up signal (WUS), which is be referred to as the wake up signal occasion 400, where the UE 106 may for example conduct this monitoring by using a certain downlink control information (DCI) format, such as a power saving downlink control information (PS-DCI) format, before the 'onDuration' 402, in order to trigger the UE 106 monitoring during the 'onDuration' 402. This downlink control (DC) may be scrambled with a power saving radio network temporary identifier (PS-RNTI). WUS, or wake-up signal, may be referred also as DCI format with CRC scrambled using PS-RNTI (power saving RNTI), power saving indication, wake-up indication or PDCCH-WUS or indication to start on duration timer in the next (or the corresponding) occurrence of drx-onDurationtimer or power save indication (PSI).

General Methodology: Protocol Stack for 5G NR

Figure 5:
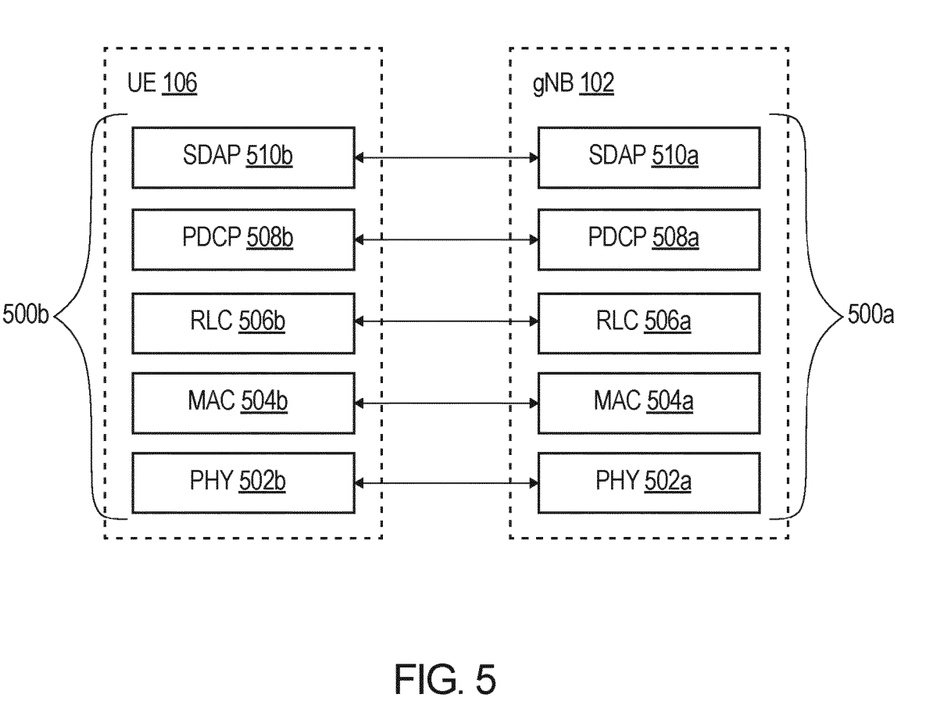
FIG. 5 illustrates a protocol layers for the UE and gNB, in accordance with an example embodiment.

A protocol architecture for 5G NR includes protocol layers 500*a/b* that include: a protocol stack 500 for the gNB 102; and a user plane 500*b* for the UE 106. These protocol layers 500*a/b* share similarities, and communication with each other. The protocol layers 500*a/b* include: a physical (PHY) layer 502*a/b* that is a first and lowest layer that includes electronic circuit transmissions and underlies higher level network functions; a media access control (MAC) layer 504*a/b* is a sublayer that controls hardware responsible for interaction with wired, optical or wireless transmission medium, and which is a sublayer that offers logical channels to the next highest layer (i.e., RLC); a radio link control (RLC) layer 506*a/b* that accepts logical channels from the MAC 504*a/b*; a packet data convergence protocol (PDCP) layer 508*a/b*, that offers radio bearers to the next highest level (i.e., SDAP); and a service data adaptation protocol (SDAP) layer 510*a/b* that accepts the radio bearers from PDCP 508*a/b*.

Figure 7:
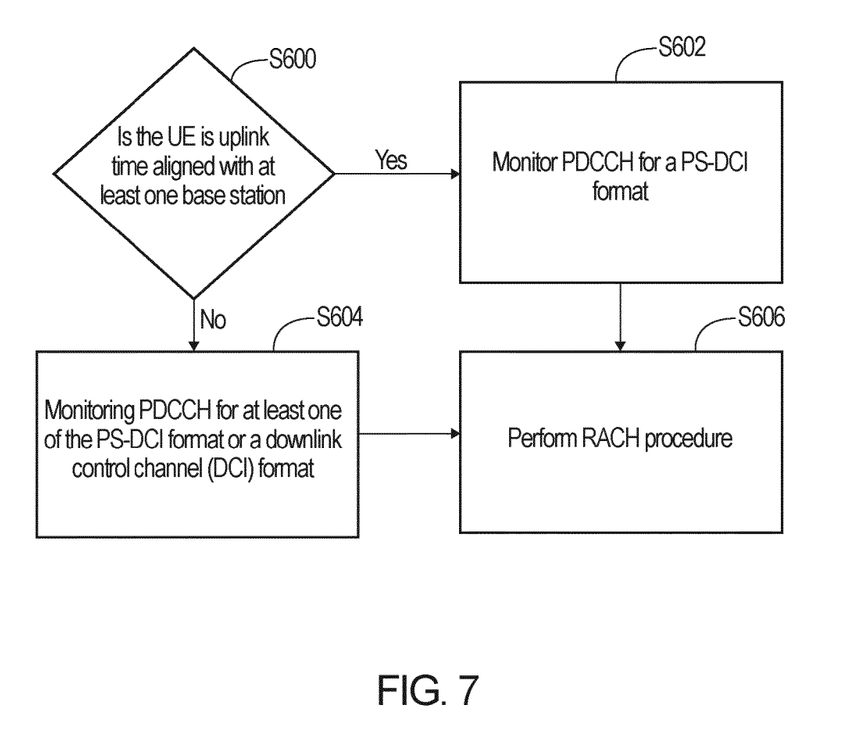
FIG. 7 illustrates a method of power saving for the UE, in an example embodiment.

In an example embodiment, the power savings method disclosed in FIG. 7, pertains to power savings for the UE 106 that is performed at the physical layer 502*b*.

General Methodology: Timing Advance Group

The instant example embodiment includes a concept of a 'timing advance group.' In an example embodiment, this is a group of Serving Cells that are configured by radio resource control (RRC) that, for the cells with uplink (UL) configured, use a same timing reference cell and a same timing advance value. In an example embodiment, a Timing Advance Group contains a SpCell of a MAC entity, which may be referred to as a Primary Timing Advance Group (PTAG), whereas a Secondary Timing Advance Group (STAG) refers to other Timing Advance Groups (TAGs).

General Methodology: Problem

A maintenance of uplink time alignment is supervised by the MAC layer 504*a/b* (see FIG. 5) using a RRC configured time alignment timer (referred to as 'timeAlignmentTimer (TAT).' In an example embodiment, when the TAT is running, the UE 106 can consider itself uplink time aligned. The UE 106 may lose the time alignment, for example, when there is no communication in UL or DL for a while, and the TAT expires.

In an example embodiment, the WUS is configured to be received and processed by the processor 320 of the UE 106, so that the UE 106 monitors the physical downlink control channel (PDCCH), prior to a start of the on duration 402 (see FIG. 4) of the DRX cycle, to determine whether the WUS indicates that the UE 106 is to wake up for the next (or corresponding) on duration 402. That is to say, the processor 320 of the UE 106 determines whether to start 'onDuration-Timer' and monitor the PDCCH.

In an example embodiment, as the expiry prevents the UE 106 from performing any other transmission (or, when the UE 106 cannot consider itself to be uplink timer aligned anymore), other than random access, the UE 106 needs to wait until a network triggers the processor 320 of the UE 106 to perform random access (i.e., PDCCH order), or the UE 106 initiates a contention based random access when the UE 106 determines that it has UL data in the memory 340 (e.g., buffer).

The example embodiments complete this procedure in an efficient manner to improve communication latency and power saving for the UE 106.

General Methodology: DRX Framework

In an example embodiment, the PDCCH monitoring activity of the UE 106, in a radio resource control (RRC) connected mode, is governed by a discontinue reception DRX framework. In an example embodiment, when DRX is configured, the UE 106 does not have to continuously monitor PDCCH. DRX is characterized by the following:

OnDuration: the 'on duration' 402 (FIGS. 4 and 6) is a duration that the UE 106 waits for, after waking up, to receive PDCCHs. If the UE 106 successfully decodes a PDCCH, the UE 106 stays awake and starts an inactivity timer.

Inactivity-timer: a duration that the UE 106 waits to successfully decode a PDCCH, from the last successful decoding of a PDCCH, where the UE 106 will go back to sleep if this fails. In an example embodiment, the UE 106 shall restart the inactivity timer following a single successful decoding of a PDCCH event that schedules transmission of uplink (UL) or downlink (DL) data (for a first transmission only, i.e. not for retransmissions).

Retransmission-timer: a duration until a retransmission can be expected.

Figure 6:
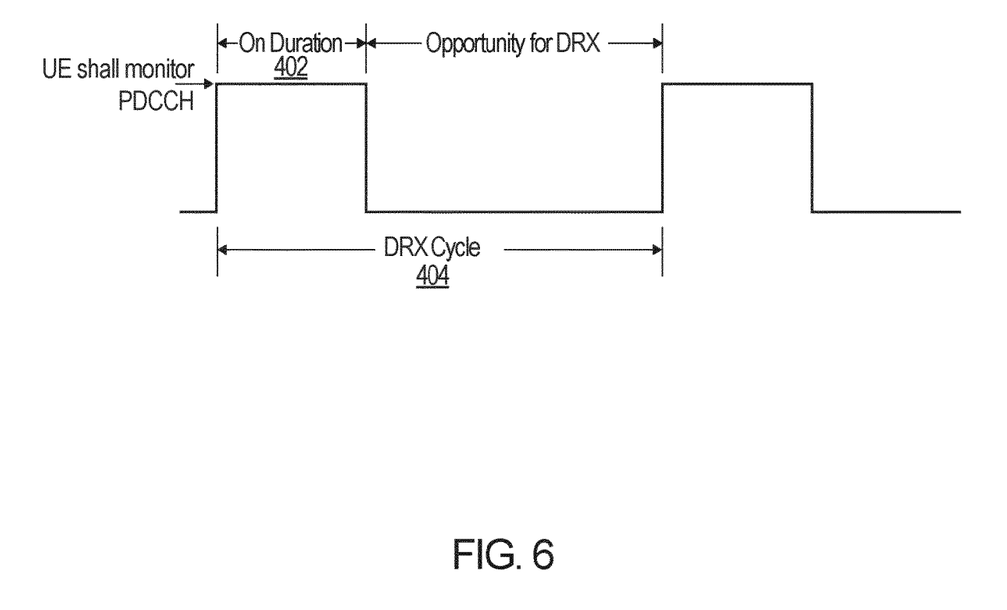
FIG. 6 illustrates a discontinue reception (DRX) cycle for the UE, in an example embodiment.

Cycle: this cycle, or DRX cycle 404 (FIG. 6), specifies a periodic repetition of the on-duration 402 (FIG. 6), followed by a possible period of inactivity (see FIG. 6).

Active time: total duration that the UE 106 monitors PDCCH. This time includes the "on-duration" 402 of the DRX cycle 404, the time the UE 106 is performing continuous reception while the inactivity timer has not expired, and the time when the UE 106 is performing continuous reception while waiting for a retransmission opportunity.

Furthermore, as discussed above, the UE 106 may be configured to monitor PDCCH based a wake-up signal (WUS), for certain DCI formats before the onDuration 402, in order to trigger the monitoring by the UE 106 during onDuration 402.

General Methodology: QCL Framework

The 3GPP definition of QCL (quasi co-location) is that two antenna ports are said to be quasi co-located if properties of the channel over which a symbol on one antenna port is conveyed can be inferred from the channel over which a symbol on the other antenna port is conveyed. When two different signals share the same QCL type, they share the same indicated properties. As an example, the QCL properties may be e.g. delay spread, average delay, doppler spread, doppler shift, spatial RX. QCL type A means Doppler spread, Doppler shift, delay spread, and/or average delay, and QCL type D means spatial RX. Currently 38.214 lists following QCL types:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

As a further example if a CSI-RS and SSB have the type D QCL assumption between each other, it means that UE may utilize same RX spatial filter (beam) to receive these signals.

MECHANISMS OF EXAMPLE METHOD EMBODIMENTS: SUMMARY

The example embodiment includes methods to quickly enable the processor 320 of the UE 106 to obtain time alignment to respond to WUS 400, when the network is configured to utilize WUS 400 to wake up the UE 106.

In one example embodiment, an indication to perform a random access channel (RACH) procedure is provided for power saving specific to downlink (DL) signaling. This indication may include any of following alternatives:

First Major Embodiment: In first example embodiment, when the UE 106 has determined that its TAT has expired, and the UE 106 is configured to monitor for WUS occasion(s) 400, the UE 106 searches additionally the DCI format for a PDCCH ordered RACH (if the CRC of the DCI format 1_0 is scrambled by a cell radio network temporary identifier, or C-RNTI, and a "Frequency domain resource assignment" field are of all ones), for an indication to perform a contention free RACH procedure. The network may transmit the DCI (that triggers PDCCH order), in the PDCCH based power saving channel. If the UE 106 has a valid timing advance (TA), the UE 106 is not required to monitor the DCI format in the WUS/search space where it monitors the power saving DCI format (PS-DCI) or Power saving PDCCH search space. For scrambling the DCI format for PDCCH ordered RACH, the power saving radio network temporary identifier (PS-RNTI) or C-RNTI may be used.

Second Major Embodiment: In a second example embodiment, the PS-DCI (power saving DCI) format, which is a field that is used to indicate whether the UE 106 shall trigger RACH procedure to obtain UL timing advance. This field may be 1-bit (or n-bit) field to indicate the UE 106 shall initiate RACH procedure. The field may implicitly indicate to the UE 106 to start onDurationTimer (monitor PDCCH) after completion of the RACH procedure. The RACH procedure may be one of a contention based random access (CBRA) or contention free random access (CFRA).

In one alternative embodiment, of this second embodiment, a new additional DCI format, providing a PDCCH order for RACH, may be used, and the new additional DCI format can be sent using a PS-RNTI.

Third Major Embodiment: In a third example embodiment, the network may pre-configure the UE 106 with a CFRA PRACH resource, or resources and to trigger the PDCCH order to those resources. The triggering may be provided in the power saving downlink control information (PS-DCI)/WUS/DCI format with CRC scrambled. As an implementation of this third embodiment, three options are described below.

Option 1: If a 1 (one) bit signaling is used (or, any indication that is not explicitly triggering the CFRA procedure with explicit resource allocation), in an example embodiment the UE 106 may be configured with one dedicated PRACH resource. Alternatively, if the 1 (one) bit signaling is used (or any indication that is not explicitly triggering the CFRA procedure with explicit resource allocation), and the UE 106 has been configured with multiple CFRA resources, the UE 106 selects one of the resources to initiate RACH procedure. UE may select one of the resources that has RSRP/RSRQ/SINR above a network configured threshold level. In an example embodiment, UE may select or prioritize the selection of the CFRA resource (or CBRA resource in case CFRA resources are not suitable based on the signal quality threshold wherein the signal quality threshold may be optional) that corresponds to a downlink reference signal (DL RS) that is spatially quasi co-located (QCL) with; the PDCCH DMRS (i.e. DL RS that correspond to the PDCCH beams) during active time (i.e. when UE is monitoring PDCCH according to search space configuration), DL RS corresponding any of the transmission configuration indicator (TCI) states for PDCCH/PDSCH/PUCCH/PDSCH or with the PDCCH DMRS used to transmit the WUS.

Option 2: In this option, no explicit trigger is provided, and when the UE 106 detects the WUS transmission 400 in the monitored occasion, and the UE 106 determines that it does not have a valid TA, so the UE 106 triggers PRACH on the configured CFRA PRACH resource or resources. In one alternative, UE may trigger contention based random access procedure in case the CFRA resource is not configured, or use of CFRA resources are not considered in the implicit triggering.

Option 3: In this option, the network triggers one or more of the pre-configured CFRA PRACH resources with explicit signaling (e.g., a logical index in the set of PRACH preambles e.g. in form of a bitmap or explicit index), where the UE 106 shall trigger the CFRA PRACH. In case multiple resources are indicated UE may select one of the resources. In some cases the selection may be determined based on signal quality threshold based on the corresponding DL RS.

Fourth Major Embodiment: In one additional embodiment, when the PRACH procedure is triggered, and the WUS is configured, the UE 106 shall prioritize PRACH resources that correspond to the DL RS that is quasi co-located (QCL) e.g. in terms of spatial RX with the active time PDCCH TCI states, or with DL RS that is QCL with PDCCH demodulation reference signal (DMRS) that was used to transmit the wake up signal (where the UE 106 successfully detects the WUS transmission 400). The triggered RACH procedure may be CBRA or CFRA.

In the embodiments above, the UE 106 monitors the DCI format for PDCCH ordered random access procedure using the power saving radio network temporary identifier (PS-RNTI). In some cases UE may monitor the said DCI format using PS-RNTI or C-RNTI or both.

In any of the embodiments herein, network may trigger either contention based or contention free random access procedure using a specific DCI format or using an indication in the PS-DCI format.

In any of the embodiments herein, the indication to initiate RACH procedure using specific random access preamble resource (either CFRA/CBRA) may be a logical index (based on preconfigured set) or it may be an explicit index of a RACH resource.

In one example embodiment, in any of the embodiments herein, network may indicate UE to initiate random access procedure without instructing UE to wake up to monitor PDCCH during the on duration (e.g. start the drx-ondurationTimer to monitor PDCCH).

In an example embodiment, when the group based WUS signal is configured and it indicates UE to wake up, the UE 106 determines if the TAT has expired, and will then trigger a RACH procedure (using potentially preconfigured RACH resources or CBRA).

In an alternative example embodiment, the trigger to initiate RACH procedure may be implicit. When the UE is configured to monitor power saving downlink control information (wake up signal/wake up indication) and it indicates UE to wake up, the UE 106 determines if the TAT has expired, and will then trigger a RACH procedure (using potentially preconfigured RACH resources or CBRA). For triggering the RACH procedure UE may use any of the methods in any of the embodiments herein.

An Embodiment of an Example Method: Detailed Description

FIG. 7 illustrates a method of power saving for the UE 106, in an example embodiment. In an example embodiment, this method includes a set of computer-readable instructions that are saved to the memory 340 of the UE 106 (see FIG. 3), where the processor 320 of the UE 106 performs these instructions at the physical layer 502*b* of the UE 106 (see FIG. 5). In an example embodiment, the UE 106 uses a wake up signal (WUS) 400 within the framework of a discontinue reception (DRX) cycle 404 (FIG. 6), to save power. In the event of expiry or loss of the uplink time alignment timer (TAT), the processor 320 of the UE 106 will cause the UE 106 to wait before performing a random access procedure (RACH). During this wait period, and without the use of WUS 400, conventionally the power of the UE 106 would be consumed even though the UE 106 is not actively transmitting/receiving data with the gNB 102. Specifically, using a conventional DRX cycle 404 without WUS 400, a conventional network would configure the TAT to ensure it is not shorter than the duration of the DRX cycle 404, meaning that the TAT would not expire when the UE 106 is sleeping (for instance, according to 3GPP standard TS 38.331, the TAT is 0.5-10 seconds). However, by using WUS 400 in the example embodiment of FIG. 7, multiple DRX cycles 404 may be skipped (e.g., multiple 'on duration' periods 402 may be skipped), thus allowing the TAT to expire, even though the TAT may be longer than a single, or multiple, DRX cycles 404. This method therefore reduces unproductive and/or power consumption by the UE 106, by ensuring that a time alignment is quickly obtained. Based on this general explanation, the method of FIG. 7 is described in detail below.

At the outset of the method of FIG. 7, it is presumed that the processor 320 of the UE 106 is arranged to communicate with the memory 340, where the memory 340 includes computer-readable instructions that configure the processor 320 to monitor the power savings channel of the PDCCH for the wake up signal 400 (FIG. 6), so that the wake up signal 400 can notify the processor 320 of a start time for the "on duration" 402 (where the "on duration" 402) is used in step S604. The steps of FIG. 7 are performed at the UE 106.

As shown in FIG. 7, at step S600, the processor 320 of the UE 106 determines if the UE 106 is time aligned with at least one gNB 102. This can for instance be accomplished by the processor 320 determining if the timeAlignmentTimer for the UE 106 has expired. If the UE 106 is time aligned, then in step S602 the processor 320 monitors the PDCCH for the power saving downlink control information (PS-DCI) format for the at least one gNB 102.

If the UE is not time aligned, then in step S604 the processor 320 searches the power saving DCI format in the power saving search space and additionally the DCI format for PDCCH ordered RACH (in the same search space where it searches the PS-DCI), to determine if the cyclic redundancy check (CRC) of the DCI format 1_0 is scrambled by PS-RNTI and the "frequency domain resource assignment" field are of all ones for an indication to perform contention free RACH procedure.

In step S606, the processor 320 performs a RACH procedure. In an example embodiment, the RACH procedure is performed in response to determining that the UE 106 is triggered by PDCCH ordered RACH, and the processor 320 determines based on the power saving DCI whether to enter active time i.e. start the onDurationTimer on the next or the corresponding occurrence (of the timer). In an example embodiment, the DCI format to trigger PDCCH ordered RACH is scrambled by C-RNTI or PS-RNTI.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method, comprising:
   performing, by at least one processor of a user equipment (UE), at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for the UE to monitor the PDCCH; and
   performing, by the at least one processor, a random-access channel (RACH) procedure with the at least one base station based on the control information; and
   wherein the RACH procedure causes the UE to prioritize physical random-access channel (PRACH) resources that correspond to downlink reference signals that are quasi co-located with PDCCH demodulation reference signal (DMRS) of the PDCCH used to monitor PS-DCI or with PDCCH DMRS used for monitoring the PDCCH according to a search space configuration during an active time.

2. The method of claim 1, further comprising:
   determining if the UE is not uplink time aligned with at least one cell; and
   performing a second monitoring of the PDCCH for indication information, if the UE is not uplink time aligned, the indication information including an indication that the UE is to initiate the RACH procedure.

3. The method of claim 2, wherein the second monitoring further includes,
   monitoring the PDCCH for a downlink control information (DCI) format for the indication information to initiate random access procedure.

4. The method of claim 2, wherein the second monitoring further includes, monitoring the PDCCH for the PS-DCI format, wherein the PS-DCI format includes the indication information.

5. The method of claim 2, wherein the second monitoring further includes, scrambling the PS-DCI format using a power saving radio network temporary identifier (PS-RNTI).

6. The method of claim 2, further comprising:
   initiating the RACH procedure, in response to the indication information, and determining based on the PS-DCI format whether to enter an active time, the active time starting an on duration timer for a next ON duration in the DRX cycle.

7. The method of claim 2, wherein the indication information indicates to the UE to start an on duration timer to monitor the PDCCH after the completion of the RACH procedure or during the RACH procedure.

8. The method of claim 2, wherein the performing includes,
   performing the RACH procedure, based on the indication information, in order to obtain an uplink timing advance.

9. The method of claim 1, wherein the RACH procedure includes at least one of a contention free RACH procedure, a PDCCH ordered RACH procedure or a contention based RACH procedure.

10. The method of claim 1, wherein the PS-DCI format includes a 1 bit signal that triggers the UE to perform a contention free random access procedure (CFRA) using predefined resources configured for the UE.

11. The method of claim 1, further comprising:
    determining if the UE is configured to receive the PS-DCI format as a group based PS-DCI and a time alignment timer has expired, the PS-DCI format including indication information, the indication information including an indication that the UE is to initiate the RACH procedure,
    wherein the performing of the RACH procedure is accomplished using preconfigured RACH resources, if the PS-DCI format is a group based PS-DCI.

12. A user equipment (UE), comprising:
    a memory containing computer-readable instructions; and
    at least one processor configured to read and execute the computer-readable instructions, in order to cause the UE at least to:
    perform at least one first monitoring of a power savings channel of a physical downlink control channel (PDCCH) for control information, the PDCCH being associated with at least one base station, the control information including a power saving downlink control information (PS-DCI) format, the control information providing an indication to start a timer for an ON duration of a discontinuous reception (DRX) cycle for the UE to monitor the PDCCH, and
    perform a random-access channel (RACH) procedure with the at least one base station based on the control information; and wherein the RACH procedure causes the UE to prioritize physical random-access channel (PRACH) resources that correspond to downlink reference signals that are quasi co-located with PDCCH demodulation reference signal (DMRS) of the PDCCH used to monitor PS-DCI or with PDCCH DMRS used for monitoring the PDCCH according to a search space configuration during an active time.

13. The user equipment (UE) of claim 12, wherein the at least one processor is further configured to,
    determine if the UE is not uplink time aligned with at least one cell, and
    perform a second monitoring of the PDCCH for indication information, if the UE is not uplink time aligned, the indication information including an indication that the UE is to initiate the RACH procedure.

14. The user equipment (UE) of claim 13, wherein the at least one processor is further configured to perform the second monitoring by,
    monitoring the PDCCH for a downlink control information (DCI) format for the indication information to initiate random access procedure.

15. The user equipment (UE) of claim 13, wherein the at least one processor is further configured to perform the second monitoring by,
    monitoring the PDCCH for the PS-DCI format, wherein the PS-DCI format includes the indication information.

16. The user equipment (UE) of claim 13, wherein the at least one processor is further configured to perform the second monitoring further includes,
    scrambling the PS-DCI format using a power saving radio network temporary identifier (PS-RNTI).

17. The user equipment (UE) of claim 13, wherein the RACH procedure includes at least one of a contention free RACH procedure, a PDCCH ordered RACH procedure or a contention based RACH procedure.

18. The user equipment (UE) of claim 13, wherein the at least one processor is further configured to:
    initiate the RACH procedure, in response to the indication information, and determine based on the PS-DCI format whether to enter an active time, the active time starting an on duration timer for a next ON duration in the DRX cycle.

19. The user equipment (UE) of claim 13, wherein the indication information indicates to the UE to start an on duration timer to monitor the PDCCH after the completion of the RACH procedure or during the RACH procedure.

* * * * *